United States Patent [19]
Buchholz et al.

[11] Patent Number: 5,341,375
[45] Date of Patent: Aug. 23, 1994

[54] TRANSMISSION OF BROADCAST PACKETS IN AN RF SYSTEM

[75] Inventors: Dale R. Buchholz, Palatine; Karen E. Robbins, Lake Zurich; William K. Doss, Lake in the Hills; R. Lee Hamilton, Jr., Palatine, all of Ill.

[73] Assignee: Motorola, Inc., Schaumburg, Ill.

[21] Appl. No.: 975,452

[22] Filed: Nov. 12, 1992

[51] Int. Cl.$^5$ .............................. H04J 3/24
[52] U.S. Cl. .................... 370/94.1; 455/33.3
[58] Field of Search ........... 370/94.1, 60; 455/33.1, 455/33.3, 25, 54.1, 103, 66, 129; 342/359, 371–374, 403, 406, 422, 423, 434

[56] References Cited

U.S. PATENT DOCUMENTS

| | | | |
|---|---|---|---|
| 4,128,740 | 12/1978 | Graziano | 179/2 EB |
| 4,317,229 | 2/1982 | Craig et al. | 455/277 |
| 4,398,289 | 8/1983 | Schoute | 370/93 |
| 4,636,791 | 1/1987 | Burke et al. | 340/825.52 |
| 4,713,808 | 12/1987 | Gaskill et al. | 370/94 |
| 4,734,907 | 3/1988 | Turner | 370/60 |
| 4,905,234 | 2/1990 | Childress et al. | 370/94.1 |
| 4,926,415 | 5/1990 | Tawara et al. | 370/60 |
| 4,999,835 | 3/1991 | Lagoutte | 370/94.1 |
| 5,001,702 | 3/1991 | Teraslinna et al. | 370/60 |
| 5,016,159 | 5/1991 | Maruyama | 364/200 |
| 5,101,406 | 3/1992 | Messenger | 370/94.1 |

*Primary Examiner*—Douglas W. Olms
*Assistant Examiner*—Ajit Patel
*Attorney, Agent, or Firm*—Val Jean F. Hillman

[57] ABSTRACT

Transmission of broadcast packets (46) in a radio frequency (RF) communication system between a control module (22) and user modules (20), wherein the control module (22) and the user modules (20) each have a plurality of antennae (A1-A6) includes generating a list (1100) of control module antennae (A1-A6) in radio communication with at least one of said plurality of user modules; and selecting the listed control module antennae for transmission of broadcast packets (46).

15 Claims, 6 Drawing Sheets

| 0 | X | 0 | Y | Z | 0 |
|---|---|---|---|---|---|
| $A_1$ | $A_2$ | $A_3$ | $A_4$ | $A_5$ | $A_6$ |

*FIG.10*

| $A_2$ | $A_4$ | $A_5$ |
|---|---|---|

*FIG.11*

TRANSMISSION OF BROADCAST PACKETS IN AN RF SYSTEM

The present invention is related to the invention of U.S. patent application Ser. No. 07,620,984, filed Nov. 30, 1990 and assigned to the assignee of the present invention.

FIELD OF THE INVENTION

This invention is directed to a radio frequency (RF) packet transmission system in which selected packets are transmitted by a control module to a plurality of user modules for processing. This invention is especially suited for an RF system in which directional antennae are utilized.

BACKGROUND OF THE INVENTION

In an Ethernet local area network (LAN), broadcasting or broadcast (not to be confused with broadcast as used in the RF art) refers to the transmission of information to be received and processed by all remote devices within the network, despite differing destination addresses. Within the same field, multicast refers to the transmission of information to be received and processed by a limited group of remote devices within the network. Transmissions which are neither broadcast or multicast in nature (non-broadcast) are typically designated for a specific remote device within the network and will not be processed by any other remote devices within the network. For ease of understanding both broadcast and multicast packets may hereinafter be referred to as broadcast packets.

One simple broadcast algorithm is known as flooding. According to this technique, each incoming packet to be broadcast is sent out on every outbound line except the one on which it arrived. Obviously this technique generates a large number of duplicate packets. Typically some method is used to damp or reduce the number of duplicates.

In an Ethernet LAN, a predetermined destination address in the header of a packet identifies the packet as one to be broadcast. Receiving units interpret the packet as being addressed to them if a flood or multicast address is detected in which they are a member. Units which are not part of the selected group will reject the packet as not addressed to them.

Use of flood broadcasting techniques in an RF LAN environment present a unique set of challenges. For instance, the error characteristics of the RF system, especially where the communications path is not line of sight, is typically poorer than the error characteristics of a wired or cable LAN system. A further difficulty is presented if the RF system uses directional or sectorized antennae where only one antenna is active at a time. In this situation, the best antenna utilized by a one remote RF unit when communicating with an RF LAN will probably be different when the RF LAN communicates with yet a different remote device. Multiple antennae choices only tends to complicate the use of flood broadcast techniques in an RF LAN because a signal sent out over a selected antenna simply may not be received by all remote devices within the network.

It would be extremely advantageous therefore to provide a broadcast packet transmission system and protocol capable of resolving these shortcomings.

SUMMARY OF THE INVENTION

Briefly described, the present invention is a method and apparatus for selectively transmitting broadcast packets in a radio frequency (RF) communication system between a control module and user modules having a plurality of user devices connected thereto for receiving said broadcast packets, the control module and the user module each having a plurality of antennae oriented to provide a 360° pattern of coverage comprising apparatus structure and method steps for generating a list of control module antennae in radio communication with at least one of said plurality of user modules and selecting the listed in radio communication with at least one of said plurality of user modules antennae for transmission of all broadcast packets.

DETAILED DESCRIPTION OF A PREFERRED EMBODIMENT

Before describing an embodiment of the present invention, it is believed that an overview will aid in the reader's understanding. In order to maximize the probability that each UM within the CM zone of coverage or within a limited multicast group will receive a broadcast packet, the CM generates a list of antennas which are currently supporting RF communications with at least one UM. In the alternative, this list may contain those CM antennae which service a multicast group of users. Thereafter, the CM limits transmission of broadcast packets to the listed group of antennae. This has the effect of improving system bandwidth utilization since, broadcast packet traffic is limited to the least number of antennae necessary to reach all UMs within the broadcast or multicast groups. It will be appreciated by those skilled in the art that the CM antennae may include directional as well as omnidirectional antennae.

In order to reduce the average broadcast packet delivery delay, the CM transmits all packet fragments comprising an entire broadcast packet on one of said plurality of listed antennae, prior to transmitting any fragments comprising that broadcast packet over a second one of said plurality of listed antennae. In addition, the CM transmits the broadcast packet over each one of said listed antennas before it permits retransmission of broadcast packets information. In this way, overall system throughput is improved because each UM registered to a CM antenna receives all of the fragments comprising an entire broadcast packet, without having to wait for the individual broadcast packet fragments to be flooded, one at a time, throughout the entire CM zone of coverage, as taught by the prior art.

As part of the RF LAN system protocol, each user module marks a packet as being a broadcast packet so that the control module will recognize it as a packet to be transmitted over the listed group of antennae. Packets from the user module which are not marked are handled using a normal destination transmission protocol where only the best antenna for communicating with the destination user module is used. Thus, the present invention contemplates an RF LAN system in which broadcast packets are transmitted in such a way as to maximize the probability that user modules will receive a broadcast packet, while minimizing the average delivery delays, maximizing system bandwidth utilization and where appropriate, using a normal transmission protocol for non-broadcast packets.

Figure 1:
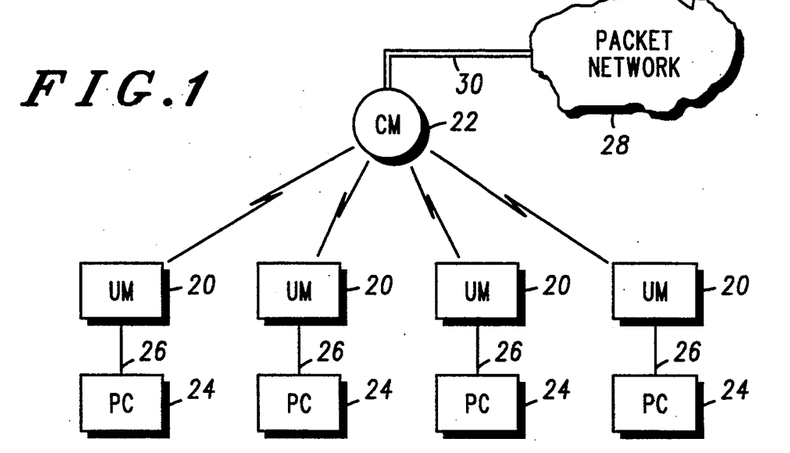
FIG. 1 illustrates in block diagram form a typical an RF LAN system.

FIG. 1 illustrates an RF LAN system in accordance with the present invention. A plurality of user modules (UM) 20 are capable of RF communications with control module (CM) 22. Each user module is connected to one or more user devices such as a personal computer (PC) 24 by connection 26. The CM is connected to a packet data network 28 by channel 30. The packet data network may comprise an Ethernet network, or any of the other well known data networks, such as a Token Ring network, or an RS232 network.

Figure 2:
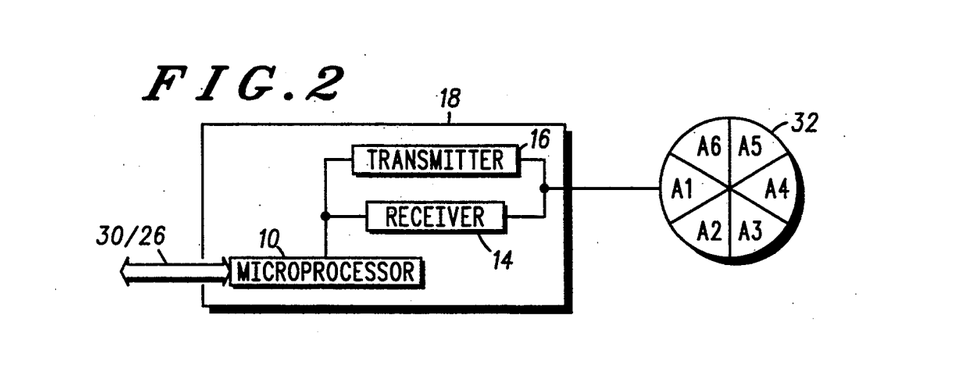
FIG. 2 is a block diagram illustrating a control module and a user module as shown in FIG. 1.

FIG. 2 shows an exemplary embodiment of a CM or a UM in accordance with the present invention. A communications unit 18 includes an RF transmitter 16, RF receiver 14, and a microprocessor system 10 which controls the operation of the unit 18. An antenna system 32 includes six directional antennas A1–A6. Each antenna provides approximately 60 degrees of RF coverage in the horizontal plane, so that the entire antenna system is capable of providing 360 degrees of RF coverage. As is known in the art, one antenna from antenna system 32 is selected by unit 18 for use at a given time.

As previously suggested, communications unit 18 and antenna system 32 are also suited for use as a UM 20. When a UM is in communication with the CM, the UM will normally select the antenna with the best signal quality for use, while the CM simultaneously selects its antenna with the best signal quality for use in communicating with the UM. For optimal communications, the CM will likely select a different antenna when communicating with different UMs. This is especially true where the RF LAN system is situated in a building with the CM located in a central position with UM located about it.

In the illustrative embodiment, a single frequency is utilized for RF communication between the CM and the UMs. Thus, each UM is capable of receiving a communication transmitted from the CM on at least one of the CM antennae.

Figure 3:
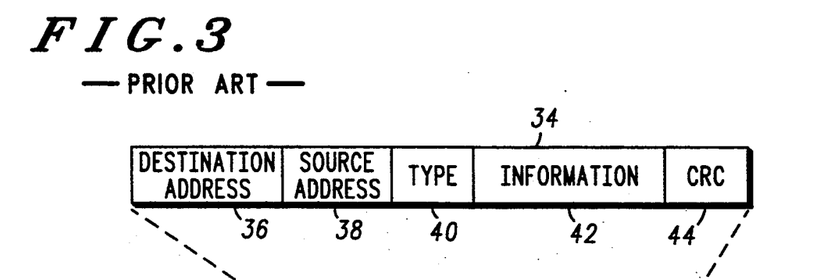
FIG. 3 illustrates the format for an Ethernet packet.

FIG. 3 illustrates a typical data packet format 34 used for the transmission of information between UM 20 and PC 24, or between CM 22 and data packet network 28. The format includes a destination address 36, a source address 38, a type designator 40, information field 42 and a cyclic redundancy check (CRC) field 44. Packet fields 36, 38 and 40 are commonly referred to as a header. The information field 42 contains the information to be transmitted, while the CRC field 44 provides error checking protection. In the preferred embodiment the data format 34 follows an Ethernet format. Thus, the destination address contains the address that identifies the packet as a broadcast, multicast, or single device destined packet.

Figure 4:
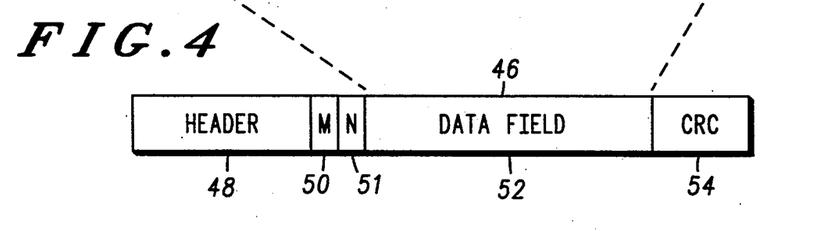
FIG. 4 illustrates a format for an RF packet in accordance with the present invention.

FIG. 4 illustrates an exemplary data packet format 46 used for packets to be transmitted by RF communications between UMs 20 and the CM 22. The format includes a header 48, a broadcast M field 50, a fragment identification N field 51, DATA field 52, and CRC field 54. M field 50 is utilized in the present invention as a flag which determines whether or not the packet 46 is to be handled as a broadcast packet or as a single destination packet. N field 51 is used to identify packets 46 in which the DATA field 52 of several packets (packet fragments) are to be combined in order to recreate original data too long to fit into one DATA field 52. N field 51 contains the total number of packet fragments sent and the specific number of each packet fragment, i.e., fragment No. 2-of-4. It will be apparent to those skilled in the art that header 48 includes additional overhead information needed by packet systems including destination address, source address, and other miscellaneous overhead information and instructions.

DATA field 52 may contain an Ethernet packet 34 if it is not longer than a predetermined number of L bytes. A maximum length of packet 46 is determined in accordance with the error probabilities associated with the RF LAN. The length is selected in view of the error probabilities and the percent of overhead information transmitted with each packet.

Figure 5:
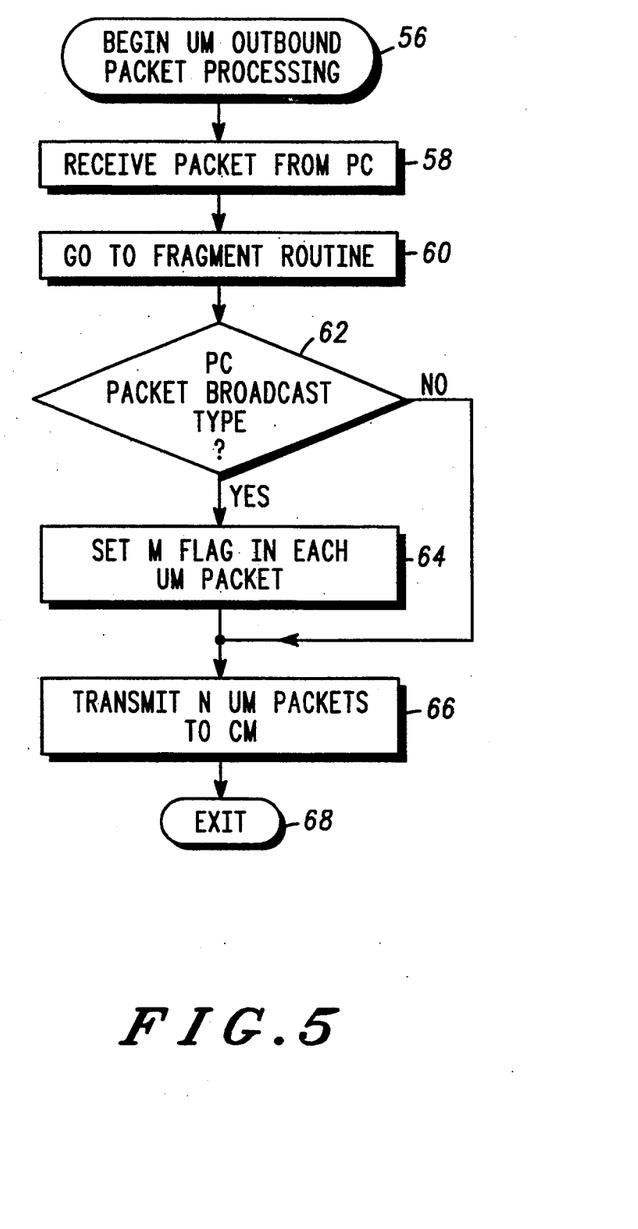
FIG. 5 is a flow chart diagram illustrating the the transmission of a broadcast packet by a user module.

FIG. 5 is a flow diagram illustrating the steps performed by communications unit 18 in conjunction with microprocessor 10 of UM 20 to process packets 46 originated by a UM and transmitted to the control module. These steps start at BEGIN entry 56. At step 58, a UM receives a packet 34 from a PC 24 connected to the UM. In step 60, processing is transferred to the fragment routine described in connection with FIG. 8. The purpose of the fragment routine is to determine if packet 34 is so large that it has to be separated into fragments and, if so, to generate new RF packets 46 for each such fragment.

Following a return from the fragment routine 60, the communications unit 18 determines, at decision step 62, whether the packet 34 is of the broadcast type. This determination may be made by inspecting the destination address 36 in packet 34 to determine if it corresponds to a broadcast or multicast packet. If the determination at step 62 is YES, the M flag 50 of each UM packet 46 is set by microprocessor unit 10. This flag is not set if the decision by step 62 is NO. In step 66 the UM transmitter 16 transmits N packets 46 to the CM. The number N represents the number of fragments determined by the fragment routine. This routine terminates at EXIT 68.

Figure 6:
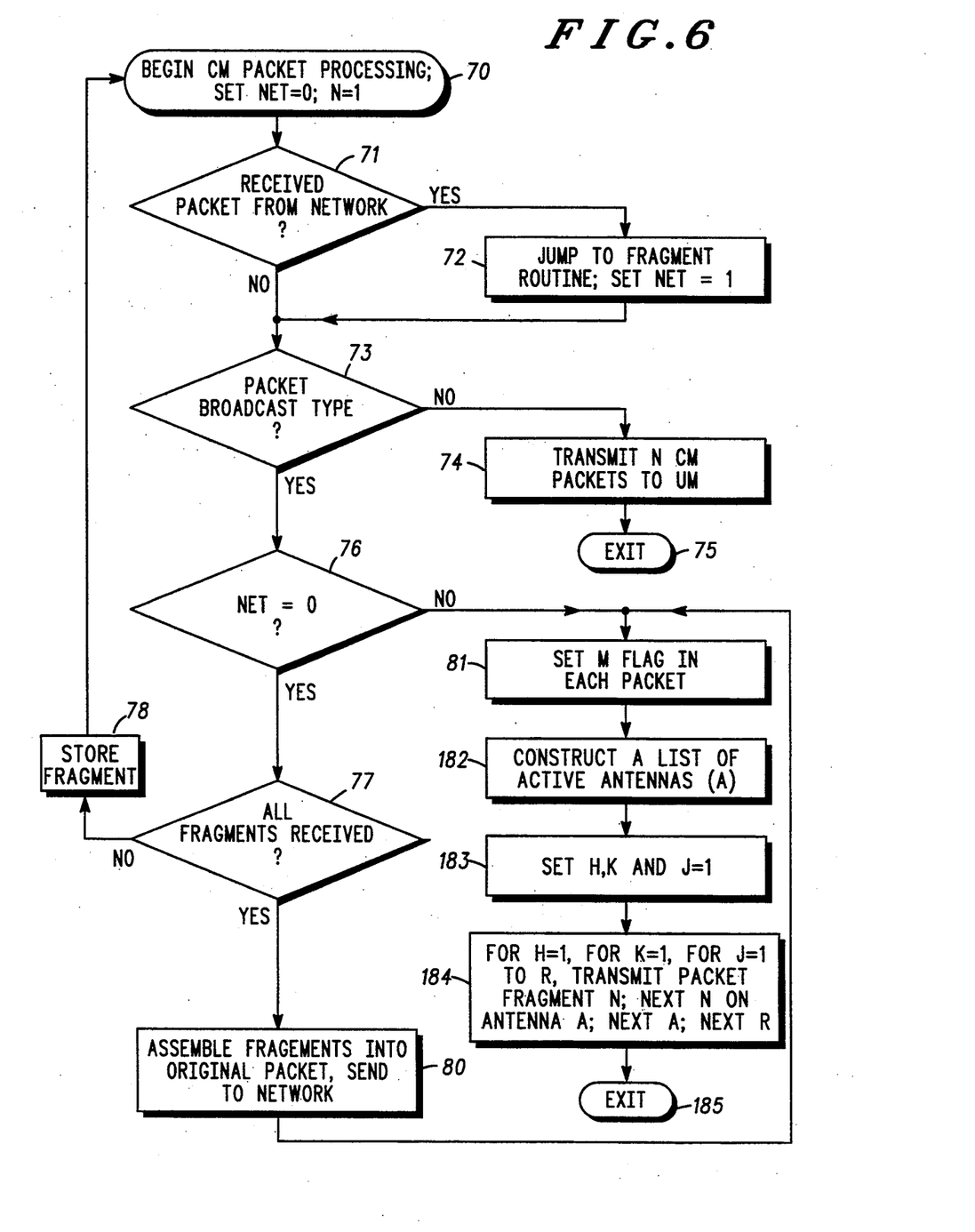
FIG. 6 is a flow diagram illustrating the processing of a broadcast packet by a control module.

FIG. 6 is a flow diagram illustrating the steps performed by communications unit 18 in conjunction with microprocessor 10 of of CM 22 to process packets received from UM 20 or packet network 28. The process starts at step 70 where the variable "Net" is set to zero. A determination is made by the unit 18 in step 71 whether the received packet came from the packet network. If YES, step 72 causes a jump to the fragment routine and upon return sets the variable "Net" to a one. Step 73 is executed either upon a NO decision at step 71 or upon completion of step 72. It should be noted that before processing by step 73, the received packet will be in a packet format 46. If the packet came from a UM, it will be received in the packet format directly. If the CM received the packet from the packet network in format 34, the fragment routine called for in step 72 will have created appropriate packets 46 to carry the information originally contained in the packet format 34.

Thereafter, communications unit 18 determines, at decision step 73, whether the received packet is a broadcast packet. If NO, step 74 causes the CM transmitter 16 to transmit the N packets 46 to the UM to which it is addressed. This routine then ends at EXIT 75. A YES determination by step 73 indicates that the received packet is a broadcast packet. In step 76 a determination is made to see whether "Net" equals zero. This determines if the received packet being processed was sent by a UM. If YES, determination step 77 determines if all fragments have been received. Upon a NO decision by step 77, the unit 18 stores the received fragment at step 78 and flow branches back to step 70 where the routine continues to process received packets until all fragments are received. A YES determination by step 77 results in the microprocessor 10 assembling the stored fragments back into the original packet 34 which is sent to the data packet network at step 80.

Upon a NO decision by step 76 or upon completion of step 80, the microprocessor 10 at step 81 sets the M flag in each packet. This will provide information to the UMs receiving the transmission that the packet is a broadcast packet to be routed to their respective PCs 24.

Figure 10:
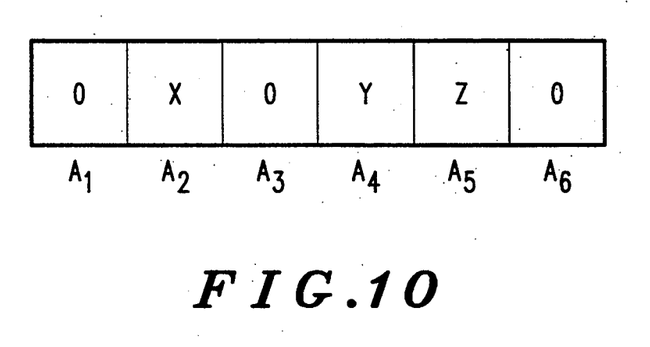
FIG. 10 illustrates an antenna registration table in accordance with the present invention.

At step 182 the CM 10 constructs a list of active antennas. The active antennas are those which are in radio communication with at least one of said plurality of UMs 12. In accordance with the preferred embodiment, the CM 10 maintains a registration table in RAM memory, which tracks the number of UMs registered to any one of the directional antennas A1-A6. The list of active antennas is compiled from the registration table entries prior to the transmission of each broadcast packet. FIG. 10 illustrates a registration table. As shown antenna elements A2, A4 and A5 are in radio communication with one or more UMs and are deemed active. The corresponding active antenna list of FIG. 11, therefore designates the directional antennas on which the broadcast packets should be transmitted. As an alternative, the process of constructing an active antenna list may be performed as a function of the registration process.

Figure 11:
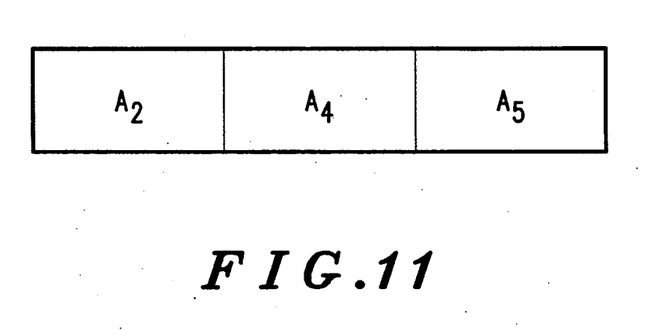
FIG. 11 illustrates an active antenna list in accordance with the present invention.

In accordance with yet another embodiment of the present invention, this technique can also be used to send multicast traffic, i.e., limited to a group of remote devices rather than to all devices within the zone of CM coverage. In accordance with this embodiment the active antenna list of FIG. 11 is representative of the antennas required to communicate with devices within the limited group.

At step 183 the microprocessor 10 sets counters for H, K and J equal to 1.

Step 184 consists of a series of three nested DO loops which causes the packet 46 to be transmitted as a broadcast packet. In this effort, a first nested loop includes a variable H in which the number N represents the number of packet fragments and hence the number of packets 46 that have to be transmitted.

The variable K in the second loop corresponds to a specific one of the plurality of directional antennae at the CM, with A corresponding to the total number of active antennae. Thus, variable K selects each antenna from the active antennae list, thereby causing all fragments 1-N to be transmitted on a single antenna before the selection of another antenna.

The variable J in the third loop determines how many times (repeat) R the same packet fragments 1-N are to be transmitted over each active antennae.

Thus, in step 184, all of the fragments 1-N constituting a broadcast packet 46 are transmitted over a single active antenna before the selection of a next active antenna. Each active antenna is selected for transmission of the complete broadcast packet 46, prior to any packet fragment retransmissions. Moreover, broadcast packet transmission is limited to the number of active antennas, since the variable A corresponds to the number of active antennas. In this example, A=3. Following the transmission of broadcast packets, this routine ends at EXIT 185.

Figure 7:
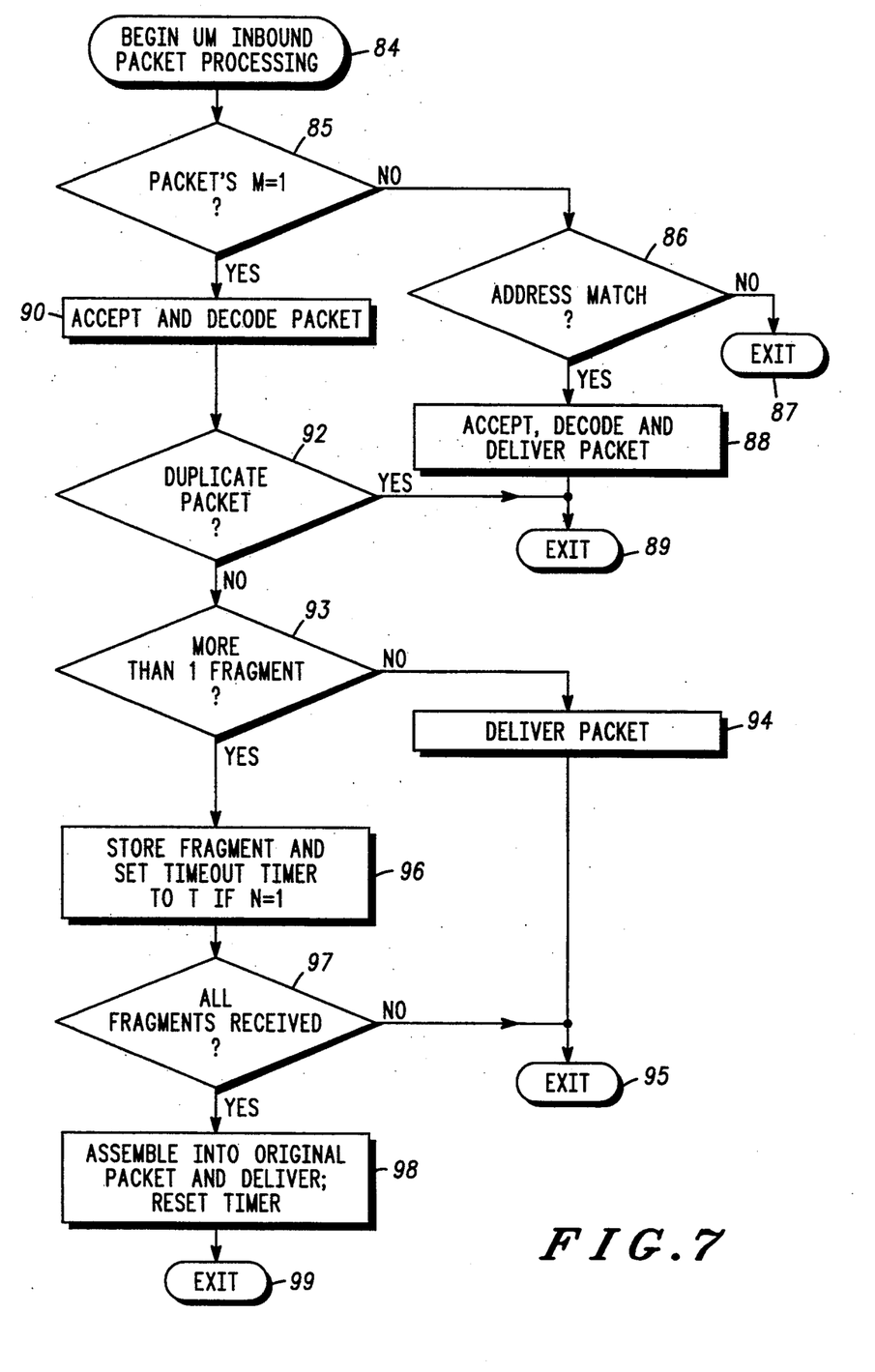
FIG. 7 is a flow diagram illustrating the processing of a received broadcast packet by a user module.

FIG. 7 is a flow diagram illustrating the steps performed by communications unit 18 in conjunction with microprocessor 10 of UM 20 to process packets received by a UM from the CM 22. Following the beginning of this routine, at step 84, the microprocessor 10 of communications unit 18 at decision step 85 determines if the received packet's header has an M flag equal to one, i.e., if the broadcast flag is set. Upon a NO decision, decision step 86 determines if the destination address of the packet matches the UM address. This system also contemplates that each device or PC coupled to the UM may have a separate address. In this case, the destination address of the received packet is compared to each of the associated user device addresses. A NO decision by step 86 results in termination of this routine at EXIT step 87 since the received packet need not be processed further by the UM. A YES decision by step 86 causes the address specific packet to be accepted, decoded, and delivered by the step 88 to the addressed user device. Following this step, the routine terminates at EXIT 89.

Following a YES determination by step 85, the received packet is accepted and decoded by the step 90 since the packet is a broadcast packet to be received by each UM. Decision step 92 determines if the received broadcast packet is a duplicate of a previously received packet. If YES, the routine terminates at EXIT step 89 since the the UM need not reprocess this previously received packet. If the packet is not a duplicate, decision step 93 determines if the received packet constitutes one of several packet fragments which contain the original information. This determination is made from information contained in the field 51 of the packet 46 which contains the total number of packet fragments containing the original information and the particular number of the fragment packets. A NO determination by step 93 results in step 94 delivering the single packet to the user devices coupled to the UM. This routine then terminates at EXIT 95.

A YES determination by step 93 corresponds to a determination that the original information being transmitted was segregated into multiple packet fragments. In step 96 the received fragment is stored in the communications unit 18 and a time out timer is set to time T on receiving the first fragment, i.e. if N=1. The action of the time out timer is described with regard to FIG. 9. In determination step 97, a NO decision causes the flow to branch back to step 84, where packet processing continues until all fragments are received.

A YES determination at decision step 97 results in step 98 assembling all of the required packet fragments into the original packet and delivering it to the corresponding user devices coupled to the UM. This routine then terminates at EXIT step 99.

It will be noted that in step 96 the time out timer is reset when the first packet fragment is received. The time out timer functions t provide a window of opportunity in which all remaining packet fragments must be received. If the time out timer reaches time T without being reset, upon receipt of the last fragment in the series, the system assumes that at least one fragment is missing, and therefore aborts the attempt to recover the broadcast packet.

Figure 8:
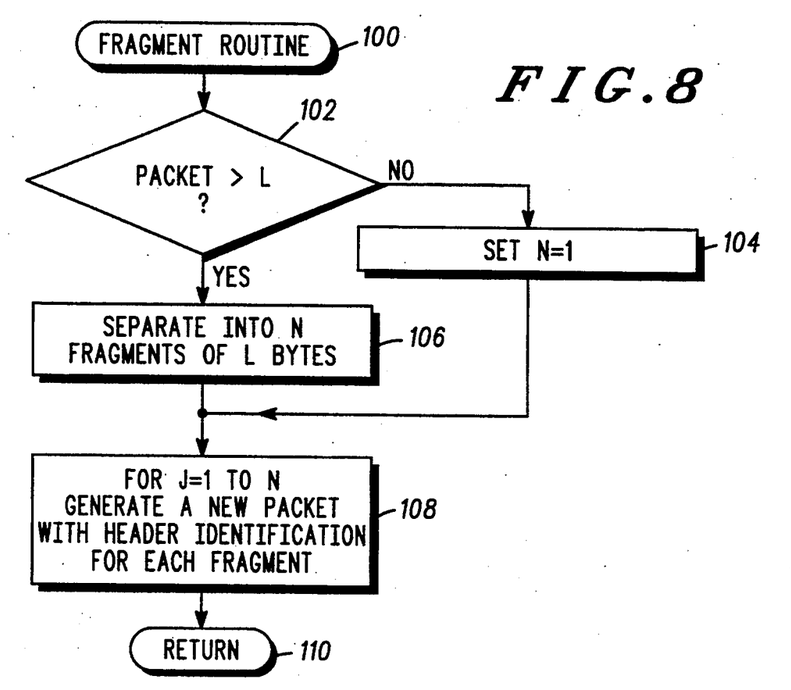
FIG. 8 is a flow diagram illustrating a fragment routine utilized to break large packet into smaller packets for transmission in accordance with the present invention.

FIG. 8 is a flow diagram illustrating the steps performed by the communications unit 18 in conjunction with microprocessor 10 during the packet fragment routine. This routine begins at entry step 100. Determination step 102 determines if the received packet is greater than (length) L bytes. A NO decision results in step 104 setting N=1. This corresponds to an original packet 34 that can be contained within one transmission packet 46. A YES decision by step 102 results in the original packet 34 being separated into N fragments of L bytes. It will be appreciated by those skilled in the art that the last fragment N may contain less than L bytes of information. In step 108, a DO loop generates a new packet 46 for each of the N fragments. Each of the packet fragments being a particular number in a total number of N fragments in the field 51. This enables the receiving module to determine when all packet fragments have been received. This routine terminates at RETURN step 110.

Figure 9:
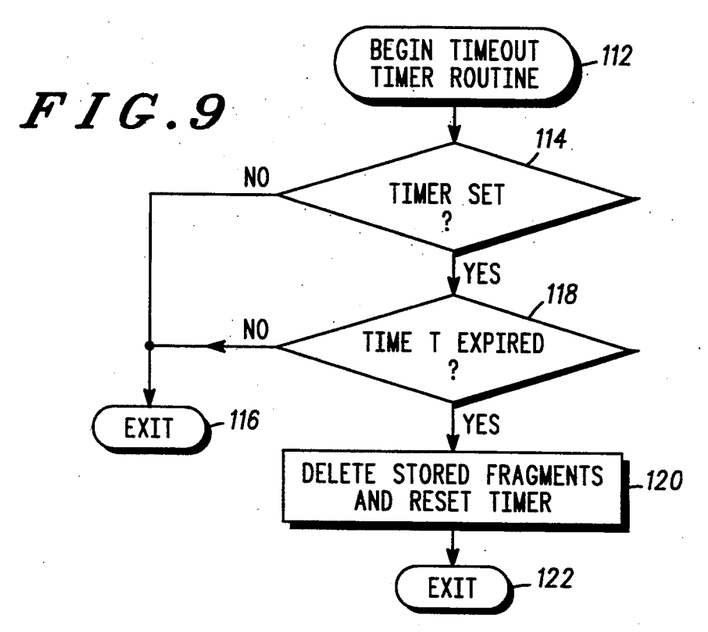
FIG. 9 is a flow diagram illustrating an exemplary time out timer utilized in accordance with FIG. 7.

FIG. 9 is a flow diagram of the time out timer routine referred to at step 92. This routine begins at entry step 112. IN step 114 a determination is made to check whether the timer is set. A NO decision results in in this routine terminating at EXIT step 116. A YES determination by step 114 results in step 118 determining if time T has expired. A NO determination terminates the routine at EXIT step 116. A YES determination results in step 120 deleting any previously stored packet fragments and resetting the the time out timer. This action occurs since all packet fragments in the current fragment series have not been received within a predetermined time. Thus, the system aborts further attempts to reconstruct the packet. This routine terminates at EXIT step 122. It is envisioned that the time out timer routine will be executed with enough frequency to ensure that the predetermined time T can be reasonably monitored for effectiveness.

The present invention provides an RF LAN system in which broadcast packet communications is enhanced by permitting selected packets to be communicated to all or a set of UMs while maintaining destination address routing of non-broadcast type packets. The probability of reception of a broadcast packet is improved by maintaining a list of antennas at the CM which are currently supporting RF communications with at least one UM, or, in the alternative, a list of antennas which services a multicast group. Thereafter, the CM limits transmission of broadcast packets to the listed group of antennas. System bandwidth utilization is maximized by limiting broadcast packet traffic to a least number of antennae necessary to reach all UMs within the broadcast or multicast group. The average broadcast packet delivery delay is reduced as the CM transmits an entire broadcast packet via one of said plurality of listed antennas, prior to transmitting the broadcast packet over a second one of said plurality of listed antennas. In addition, the control module transmits the broadcast packet over each one of said listed antennas before it permits retransmission of broadcast packets. This approach to transmission of broadcast packets in an RF LAN has the advantage of improving overall system throughput, because each UM registered to a CM antenna receives all of the fragments comprising an entire broadcast packet, without having to wait for the individual broadcast packet fragments to be flooded, one at a time, throughout the entire CM of zone of coverage, as taught by the prior art.

What is claimed is:

1. A method for selectively transmitting broadcast packets in a radio frequency (RF) communication system between a control module (CM) and user modules (UMs) having a plurality of user devices connected thereto for receiving said broadcast packets, the control module and the user modules each having a plurality of antennae, oriented to provide a 360° horizontal pattern of radio coverage, the method comprising the steps of at the control module:

generating a list of control module antennae in radio communication with at least one of said plurality of user modules; and selecting the listed control module antennae for transmission of broadcast packets.

2. The method of claim 1 further comprising the step of:

transmitting a first broadcast packet on one of said listed control module antenna, prior to transmitting that broadcast packet on a second one of said listed control module antennae.

3. The method of claim 2 further comprising the step of:

transmitting each fragment associated with a first broadcast packet on one of said listed control module antenna, prior to transmitting fragments associated with that broadcast packet on a second one of said listed control module antennae.

4. The method of claim 1 further comprising the step of:

transmitting a first broadcast packet on each of said listed control module antenna, prior to retransmitting that broadcast packet on any one of said listed control module antennae.

5. A method for selectively transmitting broadcast packets in a radio frequency (RF) communication system between a control module and user modules having a plurality of user devices connected thereto for receiving said broadcast packets, the control module and the user modules each having a plurality of antennae, oriented to provide a 360° horizontal pattern of radio coverage, the method comprising the steps of at the control module:

generating a list of control module antennae in radio communication with at least one user module (UM);

selecting the listed antennae for transmission of broadcast packets; and transmitting a first broadcast packet on one of said listed antenna, prior to transmitting that broadcast packet on a second one of said listed antennae.

6. The method of claim 5 further comprising the step of:

transmitting the first broadcast packet on each of said listed control module antenna, prior to retransmitting that broadcast packet on any one of said listed control module antennae.

7. The method of claim 5 further comprising the step of:

transmitting each fragment associated with the first broadcast packet on one of said listed control module antenna, prior to transmitting fragments associated with that broadcast packet on a second one of said listed control module antennae.

8. The method of claim 5 further comprising the steps of:

determining whether to transmit a packet received by the control module, to the user modules, as a broadcast packet; and labeling each such broadcast packet with a predetermined code (M), in a packet header portion thereof, identifying the packet as a broadcast packet.

9. A radio frequency (RF) communication system wherein information is transmitted in the form of broadcast packets between a control module (CM) and user modules (UMs) having a plurality of user devices connected thereto for receiving said broadcast packets, the control module and the user modules each having a plurality of antennae, oriented to provide a 360° horizontal pattern of radio coverage, the system comprising:

said control module;

means, coupled to said control module, for generating a list of control module antennae in radio communication with at least one of said plurality of user modules; and means, coupled to said generating means for selecting the listed antennae for transmission of broadcast packets.

10. The system of claim 9 further comprising means for transmitting a broadcast packet on one of said listed antenna, prior to transmitting that broadcast packet on a second one of said listed antennae.

11. The system of claim 9 wherein the plurality of antennae are selected from a group of devices consisting of:

directional antennae; and
omnidirectional antennae.

12. A radio frequency (RF) communication system wherein information is transmitted in the form of broadcast packets between a control module (CM) and user modules (UMs) having a plurality of user devices connected thereto for receiving said broadcast packets, the control module and the user modules each having a plurality of antennae, each oriented to provide a 360° horizontal pattern of radio coverage, the system comprising:

said control module;

means, coupled to said control module, for generating a list of control module antennae in radio communication with at least one user module (UM);

means, coupled to the generating means, for selecting the listed antennae for transmission of broadcast packets; and means, coupled to the selecting means, for transmitting a broadcast packet on one of said listed antenna, prior to transmitting that broadcast packet on a second one of said listed antennae.

13. The system of claim 12 further comprising:

means for transmitting a broadcast packet on each of said listed control module antenna, prior to retransmitting that broadcast packet on any one of said listed control module antennae; and means for transmitting each fragment associated with a broadcast packet on one of said listed control module antenna, prior to transmitting fragments associated with that broadcast packet on a second one of said listed control module antennae.

14. The system of claim 12 further comprising:

means for determining whether to transmit a packet received by the control module, to the user modules, as a broadcast packet; and means, coupled to the determining means, for labeling each such broadcast packet with a predetermined code (M), in a packet header portion thereof, identifying the packet as a broadcast packet.

15. The system of claim 12 wherein the plurality of antennae are selected from a group of devices consisting of:

directional antennae; and
omnidirectional antennae.

* * * * *